(12) United States Patent
Park et al.

(10) Patent No.: US 9,686,806 B2
(45) Date of Patent: Jun. 20, 2017

(54) APPARATUS, SYSTEM AND METHOD OF TRANSMITTING DISCOVERY FRAMES BASED ON A TRANSMISSION WINDOW

(71) Applicant: INTEL CORPORATION, Santa Clara, CA (US)

(72) Inventors: Minyoung Park, Portland, OR (US); Emily H. Qi, Camas, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/616,716

(22) Filed: Feb. 8, 2015

(65) Prior Publication Data

US 2015/0156797 A1    Jun. 4, 2015

Related U.S. Application Data

(63) Continuation of application No. 14/011,965, filed on Aug. 28, 2013, now abandoned.
(Continued)

(51) Int. Cl.
*H04L 12/841* (2013.01)
*H04L 12/807* (2013.01)
(Continued)

(52) U.S. Cl.
CPC .............. *H04W 74/08* (2013.01); *H04L 47/27* (2013.01); *H04L 47/28* (2013.01);
(Continued)

(58) Field of Classification Search
CPC .............. H04W 28/0247; H04W 74/08; H04W 74/0808; H04W 72/1226
See application file for complete search history.

(56) References Cited

U.S. PATENT DOCUMENTS

2008/0043712 A1    2/2008 Hart et al.
2009/0287827 A1    11/2009 Horn et al.
(Continued)

FOREIGN PATENT DOCUMENTS

KR    20070081359    8/2007
KR    20090063341    6/2009

OTHER PUBLICATIONS

Final Office Action of U.S. Appl. No. 14/011,965, mailed on Oct. 23, 2015, 30 pages.
International Preliminary Report on Patentability for PCT/US2014/036731, mailed on Nov. 19, 2015, 7 pages.
Office Action for U.S. Appl. No. 14/011,965, mailed on Apr. 27, 2015, 35 pages.
International Search Report and Written Opinion for PCT Patent Application No. PCT/US2014/036731, mailed on Aug. 28, 2014, 10 pages.
(Continued)

*Primary Examiner* — Redentor Pasia
*Assistant Examiner* — Peter Mak
(74) *Attorney, Agent, or Firm* — Shichrur & Co.

(57) ABSTRACT

Some demonstrative embodiments include apparatuses, systems and/or methods of adjusting transmission intervals for discovery frames. For example, an apparatus may include a wireless communication unit to communicate over a wireless communication medium according to a discovery scheme including a plurality of contention-based discovery windows, the wireless communication unit is to select a discovery window according to a transmission interval, to schedule transmission of a discovery frame for the discovery window, and to adjust the transmission interval based on whether or not the wireless communication medium is observed to be busy during a predefined time period of the discovery window.

25 Claims, 4 Drawing Sheets

Related U.S. Application Data

(60) Provisional application No. 61/819,736, filed on May 6, 2013.

(51) Int. Cl.
 *H04W 28/02* (2009.01)
 *H04W 74/08* (2009.01)

(52) U.S. Cl.
 CPC ... *H04W 28/0205* (2013.01); *H04W 28/0247* (2013.01); *H04W 74/0808* (2013.01)

(56) References Cited

U.S. PATENT DOCUMENTS

| | | |
|---|---|---|
| 2009/0323647 A1 | 12/2009 | Park et al. |
| 2011/0085455 A1 | 4/2011 | Wu et al. |
| 2012/0182890 A1 | 7/2012 | Li et al. |
| 2014/0029596 A1* | 1/2014 | Li .................. H04W 8/005 370/338 |
| 2014/0198725 A1 | 7/2014 | Abraham et al. |
| 2014/0241257 A1 | 8/2014 | Ding et al. |
| 2014/0247819 A1* | 9/2014 | Zhou ............... H04W 8/005 370/338 |
| 2014/0328168 A1 | 11/2014 | Park et al. |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group; Wi-Fi Peer-to-Peer (P2P) Technical Specification; Version 1.2; Dec. 14, 2011; 160 pages.

Office Action for Korean Patent Application No. 2015-7027511, mailed on Jul. 27, 2016, 5 pages.(Including 2 pages of English translation.).

Office Action for European Patent Application No. 14795206.3, mailed on Dec. 9, 2016, 4 pages.

European Search Report for European Patent Application No. 14795206.3 mailed on Feb. 27, 2017, 9 pages.

* cited by examiner

APPARATUS, SYSTEM AND METHOD OF TRANSMITTING DISCOVERY FRAMES BASED ON A TRANSMISSION WINDOW

CROSS REFERENCE

This application is a Continuation Application of U.S. patent application Ser. No. 14/011,965, filed on Aug. 28, 2013, which claims the benefit of and priority from U.S. Provisional Patent application No. 61/819,736 entitled "Backoff techniques for group addressed frames enabling low power discovery", filed May 6, 2013, the entire disclosures of which are incorporated herein by reference.

TECHNICAL FIELD

Embodiments described herein generally relate to adjusting transmission intervals for discovery frames.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be preformed during the DW based on a contention mechanism.

A plurality of stations may attempt to transmit discovery frames during the DWs, which may be relatively short. These attempts may result in a relatively high level of congestion within the network. The congestion may result in failure to transmit the discovery frames.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
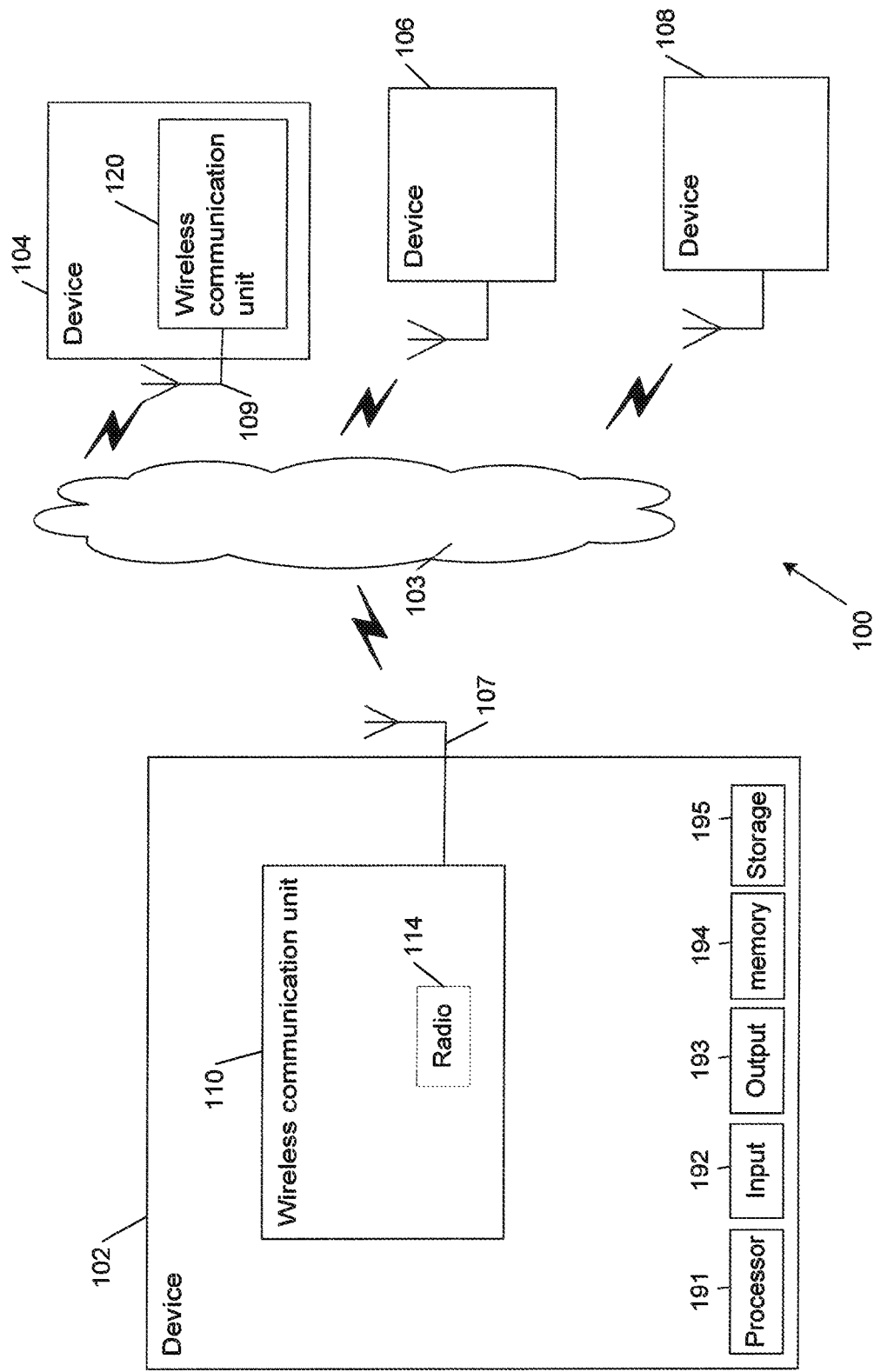
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications*, Mar. 29, 2012; *IEEE*802.11 *task group ac* (*TGac*) ("*IEEE*802.11-09/0308r12—*TGac Channel Model Addendum Document*"); *IEEE* 802.11 *task group ad* (*TGad*) (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*)

Specifications—Amendment 3: Enhancements for Very High Throughput in the 60 GHz Band, 28 Dec. 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification, version* 1.3, 2012) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 104, 106 and/or 108, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 104 106 and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 104, 106 and/or 108 may include wireless communication units, to perform wireless communication between wireless communication devices 102, 104, 106 and/or 108 and/or with one or more other wireless communication devices. For example, device 102 may include a wireless communication unit 110 and device 104 may include a wireless communication unit 120, e.g., as described below.

Wireless communication devices 102, 104, 106 and/or 108 may also include, for example, one or more of a processor 191, an input unit 192, an output unit 193, a memory unit 194, and a storage unit 195. Wireless communication devices 102, 104, 106 and/or 108 may optionally include other suitable hardware components and/or software components. In some demonstrative embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102, 104, 106 and/or 108 and/or of one or more suitable applications.

Input unit 192 includes, for example, a keyboard, a keypad, a mouse, a touch-screen, a touch-pad, a track-ball, a stylus, a microphone or, other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102, 104, 106 and/or 108.

In some demonstrative embodiments, wireless medium 103 may include, for example, a Radio Frequency (RF) channel, a WiFi channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and the like.

In some demonstrative embodiments, wireless communication medium 103 may include a wireless communication channel over a 2.4 Gigahertz (GHz) frequency band, or a 5 GHz frequency band.

In other embodiments, wireless communication medium 103 may include any other channel, e.g., a wireless communication channel over a 60 Gigahertz (GHz) frequency band, or any other frequency band.

In some demonstrative embodiments, wireless communication units 110 and 120 may include, or may be associated with, one or more antennas 107 and 109, respectively. Antennas 107 and 109 may include any type of antennas suitable for transmitting and/or receiving wireless communication signals, blocks, frames, transmission streams, packets, messages and/or data. For example, antennas 107 and 109 may include any suitable configuration, structure and/or arrangement of one or more antenna elements, components, units, assemblies and/or arrays. Antennas 107 and 109 may include, for example, antennas suitable for directional communication. For example, antennas 107 and 109 may include a phased array antenna, a single element antenna, a set of switched beam antennas, and/or the like. In some embodiments, antennas 107 and 109 may implement transmit and receive functionalities using separate transmit and receive antenna elements. In some embodiments, antennas 107 and 109 may implement transmit and receive functionalities using common and/or integrated transmit/receive elements.

In some demonstrative embodiments, wireless communication units 110 and/or 120 include, for example, one or more radios 114, e.g., including one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication devices 102, 104, 106 and/or 108 may form a wireless local area network (WLAN).

In some demonstrative embodiments, wireless communication medium 103 may include a wireless communication link over the mmWave band, e.g., the DMG band.

In some demonstrative embodiments, devices 102, 104, 106 and/or 108 may perform the functionality of mmWave STAs, e.g., DMG stations ("DMG STA"). For example, devices 102, 104, 106 and/or may be configured to communicate over the DMG band.

In some demonstrative embodiments, wireless communication medium 103 may include a wireless gigabit (WiGig) link. For example, wireless communication medium 103 may include a wireless beamformed link over the 60 GHZ frequency band.

In some demonstrative embodiments, wireless communication devices 102, 104, 106 and/or 108 may form a WiFi network.

In some demonstrative embodiments, wireless communication medium 103 may include a direct link, e.g., a P2P link, for example, to enable direct communication between device 102 and devices 104, 106 and/or 108.

In some demonstrative embodiments, wireless communication devices 102, 104, 106 and/or 108 may perform the functionality of WFA P2P devices. For example, device 102 may perform the functionality of a P2P group owner, and devices 104, 106 and/or 108 may perform the functionality of a P2P client device.

In some demonstrative embodiments, wireless communication devices 102, 104, 106 and/or 108 may form a WiFi NAN network.

In some demonstrative embodiments, wireless communication devices 102, 104, 106 and/or 108 may form a neighbor awareness networking (NAN) network. For example, devices 102, 104, 106 and/or 108 may include NAN devices, which may share a common set of NAN parameters, e.g., including a common time period between consecutive discovery windows (DWs), e.g., as described below.

In some demonstrative embodiments, wireless communication unit 110 may perform the functionality of a NAN device capable of discovering other NAN devices according to a discovery scheme.

In other embodiments, wireless communication devices 102, 104, 106 and/or 108 may form any other network.

In other embodiments, wireless communication devices 102, 104, 106 and/or 108 may perform the functionality of any other wireless communication devices.

In some demonstrative embodiments, one or more of devices 102, 104, 106 and/or 108 may perform a discovery procedure, for example, to discover each other and/or to establish a directional and/or high throughput wireless communication link.

In some demonstrative embodiments, devices 102, 104, 106 and/or 108 may transmit discovery frames according to a discovery scheme including a plurality of discovery windows.

In some demonstrative embodiments, devices 102, 104, 106 and/or 108 may communicate during a discovery window according to a contention mechanism. For example, devices 102, 104, 106 and/or 108 may check whether or not a channel is unoccupied prior to an attempt to transmit a discovery frame during the discovery window.

In some demonstrative embodiments, a device of devices 102, 104, 106 and/or 108, e.g., device 102, may not transmit the discovery frame during the DW, e.g., if the channel is occupied.

In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other frame.

In some demonstrative embodiments, the discovery frame may not require an acknowledgement frame. Therefore, a transmitter of the discovery frame may not backoff a transmission of the discovery frame.

In some demonstrative embodiments, the discovery frame transmitted by device 102 during the DW may enable other devices or services that are running on other devices to discover the device.

In some demonstrative embodiments, the DW may be relatively short.

In some demonstrative embodiments, a congestion of wireless communication medium 103 during a DW may be related to a duration of the DW and/or a number of devices in the network attempting a transmission during the DW. For example, the congestion may increase if the duration of the DW decreases and/or if the number of devices attempting to transmit discovery frames increases.

In some demonstrative embodiments, the congestion may result in failure to transmit the discovery frame.

In some demonstrative embodiments, an increased level of congestion over wireless communication medium 103 may result in an increased power consumption of device 102, e.g., since a number of attempts by device 102 to transmit the discovery frame may increase.

In some demonstrative embodiments, spreading the transmissions of discovery frames across multiple discovery windows and/or increasing the size of the discovery windows may mitigate the congestion in the discovery windows. However, spreading the transmissions of the discovery frames and/or increasing the size of the DWs may require estimating the number of devices in the network.

In some demonstrative embodiments, estimating the number of devices in the network may be difficult, e.g., since each device may see a different number of devices around it.

In some demonstrative embodiments, collisions between discovery frames within a DW may be mitigated, for example, even without estimating the number of devices, e.g., as described in detail below.

In some demonstrative embodiments, the success or failure of device 102 to transmit a discovery frame during a predefined time period of the discovery window may indicate a level of congestion of medium 103.

In some demonstrative embodiments, the ability of device 102 to transmit a discovery frame before the end of the discovery window may indicate that medium 103 is not highly congested.

In some demonstrative embodiments, the probability that device 102 may not be able to transmit the discovery frame during the discovery window may increase, e.g., if medium 103 is observed to be busy during a predefined time period of the discovery window.

In some demonstrative embodiments, wireless communication unit 110 may be configured to schedule transmissions of discovery frames based on the observation of whether or not the medium is busy during the DWs, e.g., as described below.

In some demonstrative embodiments, wireless communication unit 110 may transmit the discovery frame during a selected discovery window according to a transmission interval (TI), e.g., as described below.

In some demonstrative embodiments, wireless communication unit 110 may schedule the transmission of the discovery frame for the discovery window, e.g., as described below.

In some demonstrative embodiments, wireless communication unit 110 may adjust the transmission interval based on whether or not wireless communication medium 103 is observed to be busy during a predefined time period of the discovery window, e.g., as described in detail below.

In some demonstrative embodiments, wireless communication unit 110 may increase the TI, e.g., if wireless communication medium 103 is observed to be congested during the predefined time period of the discovery window.

In other demonstrative embodiments, wireless communication unit 110 may decrease the TI, e.g., if wireless communication medium 103 is not observed to be congested during the predefined time period of the discovery window.

In some demonstrative embodiments, the predefined time period may be related to a sensitivity of the TI to congestion. For example, a first time period may result in an adjustment of the TI, e.g., when wireless communication medium 103 has at least a first congestion level; and a second time period, e.g., shorter than the first time period, may result in an adjustment of the TI, e.g., when wireless communication medium 103 has at least a second congestion level, e.g., lesser than the first congestion level.

In some demonstrative embodiments, the predefined time period may include a time period beginning at a start time of a DW, e.g., an n-th DW, and ending within the DW. For example, the predefined time period, denoted T, may be defined, e.g., as follows:

$$T = n\text{-}th \text{ DW start time} + c \times \text{length of DW} \tag{1}$$

wherein c denotes a predefined value, for example, $0 < c < 1$, e.g., $c = 0.75$ or any other value.

In other embodiments, the predefined time period may include an entirety of the DW, e.g., if $c = 1$.

In some demonstrative embodiments, based on the transmission interval, wireless communication unit 110 may determine a number of discovery windows between successive attempts to transmit the discovery frame, and select the discovery window according to the number of discovery windows, e.g., as described below.

In some demonstrative embodiments, wireless communication unit 110 may select the number of discovery windows between a minimal transmission interval and the transmission interval, e.g., as described below.

In some demonstrative embodiments, the transmission interval may include a Service Discovery frame transmission window (TW).

In some demonstrative embodiments, device 102 may maintain the value of TW and a minimal TW value, denoted $TW_{min}$. In one example, $TW_{min} = 1$, or any other value.

In some demonstrative embodiments, wireless communication unit 110 may select, e.g., randomly, a number, denoted n, between the minimal transmission interval and the transmission interval, and may schedule transmission of the discovery frame during an n-th discovery window, wherein $n = 0$ denotes a current discovery window, e.g., as described below.

In some demonstrative embodiments, wireless communication unit 110 may adjust the transmission interval based on whether or not wireless communication medium 103 is observed to be busy during the predefined time period of the discovery window, e.g., as described in detail below.

In some demonstrative embodiments, wireless communication unit 110 may increase the transmission interval, e.g., if the medium is observed to be busy during the predefined time period. For example, the TI may be increased, e.g., if device 102 cannot transmit the discovery frame during the predefined time period in the n-th DW.

In some demonstrative embodiments, wireless communication unit 110 may increase the TI, for example, if wireless communication unit 110 observes medium 103 is busy for more than the time period T For example, wireless communication unit 110 may increase the value of TW, e.g., as follows:

$$TW = TW + a \tag{2}$$

wherein a denotes a predefined value. For example, a may include a constant value, e.g., $a = 2$, or any other value.

In some demonstrative embodiments, wireless communication unit 110 may decrease the transmission interval, for example if medium 103 is not observed to be busy for the predefined time period. For example, the TI may be decreased, e.g., if device 102 can transmit the discovery frame during the predefined time period of the n-th DW.

In some demonstrative embodiments, wireless communication unit 110 may decrease the TI, for example, if wireless communication unit 110 observes medium 103 is not busy for more than the time period T For example wireless communication unit 110 may decrease the value of TW, e.g., as follows:

$$TW = \max\{TW_{min}, (TW - b)\} \tag{3}$$

wherein b denotes a predefined value. For example, b may include a constant value, e.g., $b = 1$, or any other value.

In some demonstrative embodiments, wireless communication unit 110 may transmit the discovery frame according to any other discovery scheme, e.g., as described below.

In some demonstrative embodiments, wireless communication unit 110 may select an i-th TI, denoted $TI_i$, for the transmission of the discovery frame. For example, wireless communication unit 110 may initialize the value of TI to a minimal predefined value, denoted Nmin, e.g., $TI_1 = Nmin$.

In some demonstrative embodiments, wireless communication unit 110 may select a DW, for example, a DW separated by $TI_i$ DWs from a current DW.

In some demonstrative embodiments, wireless communication unit 110 may attempt to transmit the discovery frame within the selected DW.

In some demonstrative embodiments, wireless communication unit 110 may adjust the TI based on whether or not wireless communication medium 103 is observed to be busy during the predefined time period of the DW.

In some demonstrative embodiments, wireless communication unit 110 may decrease the selected transmission interval, e.g., if device 102 is able to transmit the discovery frame before the end of the selected DW.

In some demonstrative embodiments, wireless communication unit 110 may decrease the TI by determining a next TI, denoted $TI_{i+1}$, to be used for selecting a next DW, e.g., as follows:

$$TI_{i+1} = \max(N\min, TI_i - 1) \tag{4}$$

In another example, the successive TI may be determined by decreasing the TI according to any other scheme, e.g., follows:

$$TI_{i+1} = \max(N\min, TI_i/2) \tag{5}$$

In some demonstrative embodiments, wireless communication unit 110 may increase the selected transmission interval, e.g., if device 102 is not able to transmit the discovery frame before the end of the discovery window.

In some demonstrative embodiments, wireless communication unit 110 may increase the TI by determining the next TI to be used for selecting the next DW, e.g., as follows:

$$TI_{i+1} = \min(2TI_i, N\max) \tag{6}$$

wherein Nmax denotes a predefined value. For example, Nmax may be a maximal frequency for the discovery frame transmission.

In another example, the successive TI may be determined by increasing the TI according to any other scheme, e.g., follows:

$$TI_{i+1}=\min(TI_i+1, Nmax) \qquad (7)$$

Figure 2:
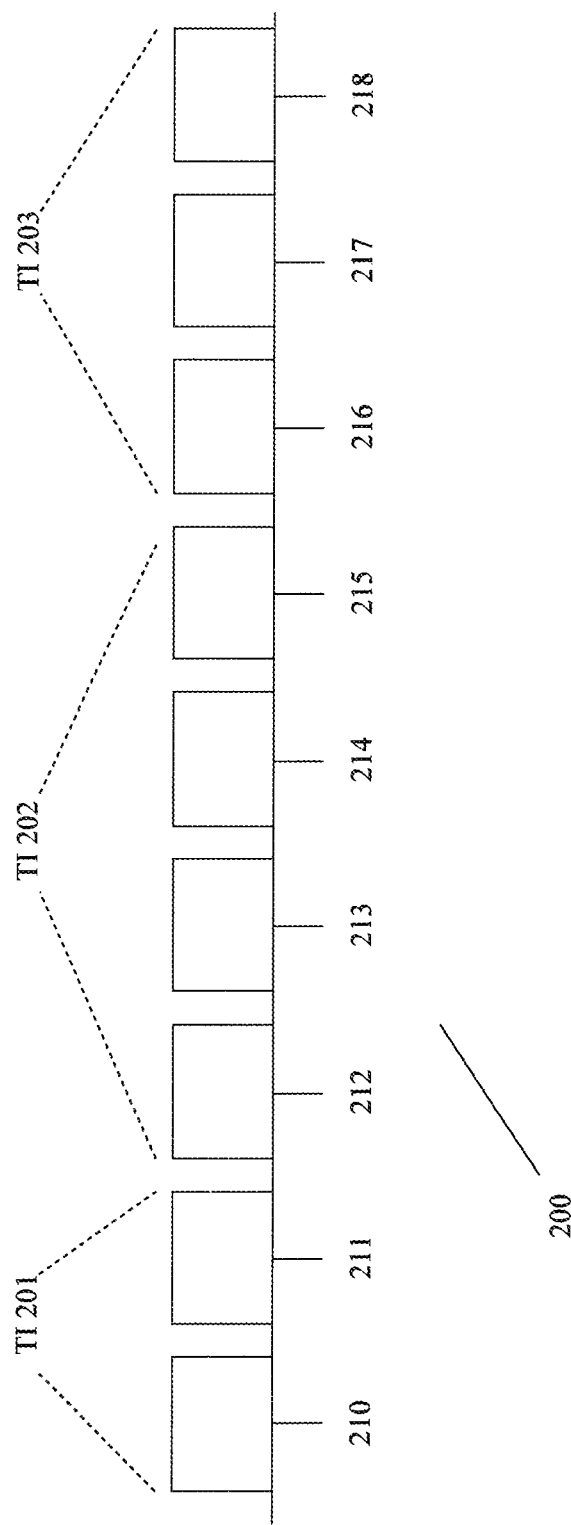
FIG. 2 is a schematic illustration of a discovery scheme including a plurality of contention-based discovery windows, in accordance with some demonstrative embodiments.

Reference in now made to FIG. 2, which schematically illustrates a discovery scheme including a plurality of discovery windows 210, 211, 212, 213, 214, 215, 216, 217 and/or 218, in accordance with some demonstrative embodiments. For example, devices 102, 104, 106 and/or 108 (FIG. 1) may be allowed to attempt transmitting discovery frames during DWs 210, 211, 212, 213, 214, 215, 216, 217 and/or 218.

In some demonstrative embodiments, wireless communication unit 110 (FIG. 1) may set a TI 201, for example, including two DWs, e.g., DW 210 and DW 211.

In some demonstrative embodiments, wireless communication unit 110 (FIG. 1) may select a DW within TI 201. For example, wireless communication unit 110 may select DW 210, e.g., if n=0.

In some demonstrative embodiments, wireless communication unit 110 (FIG. 1) may schedule a transmission of the discovery frame during the selected DW 210.

In some demonstrative embodiments, device 102 (FIG. 1) may attempt to transmit the discovery frame within the selected DW 210.

In some demonstrative embodiments, wireless communication unit 110 (FIG. 1) may adjust the transmission interval, e.g., based on whether or not wireless communication medium 103 (FIG. 1) is observed to be busy during a predefined time period of discovery window 210.

In some demonstrative embodiments, wireless communication unit 110 (FIG. 1) may set a TI 202 successive to TI 201, e.g., based on whether or not device 102 (FIG. 1) is able to transmit the discovery frame during the predefined time period in DW 210.

In some demonstrative embodiments, TI 202 may be longer than TI 201, e.g., if device 102 (FIG. 1) is unable to transmit the discovery frame during the time period T within DW 210. For example, TI 202 may include four DWs, e.g., DWs 212, 213, 214 and/or 215. For example, wireless communication unit 110 (FIG. 1) may determine TI 202 according to Equation 2, e.g., if a=2.

In some demonstrative embodiments, wireless communication unit 110 (FIG. 1) may select a DW within TI 202. For example, wireless communication unit 110 may select DW 215, e.g., if n=3.

In some demonstrative embodiments, wireless communication unit 110 (FIG. 1) may schedule a transmission of the discovery frame during the selected DW 215.

In some demonstrative embodiments, device 102 (FIG. 1) may attempt to transmit the discovery frame within the selected DW 215.

In some demonstrative embodiments, wireless communication unit 110 (FIG. 1) may adjust the transmission interval based on whether or not wireless communication medium 103 (FIG. 1) is observed to be busy during a predefined time period of discovery window 215.

In some demonstrative embodiments, wireless communication unit 110 (FIG. 1) may set a TI 203 successive to TI 202, e.g., based on whether or not device 102 (FIG. 1) is able to transmit the discovery frame during the predefined time period in DW 215.

In some demonstrative embodiments, TI 203 may be shorter than TI 202, e.g., if device 102 (FIG. 1) is able to transmit the discovery frame during DW 215. For example, TI 203 may include three DWs, e.g., DWs 216, 217 and/or 218. For example, wireless communication unit 110 (FIG. 1) may determine TI 203 according to Equation 3, e.g., if b=1.

Figure 3:
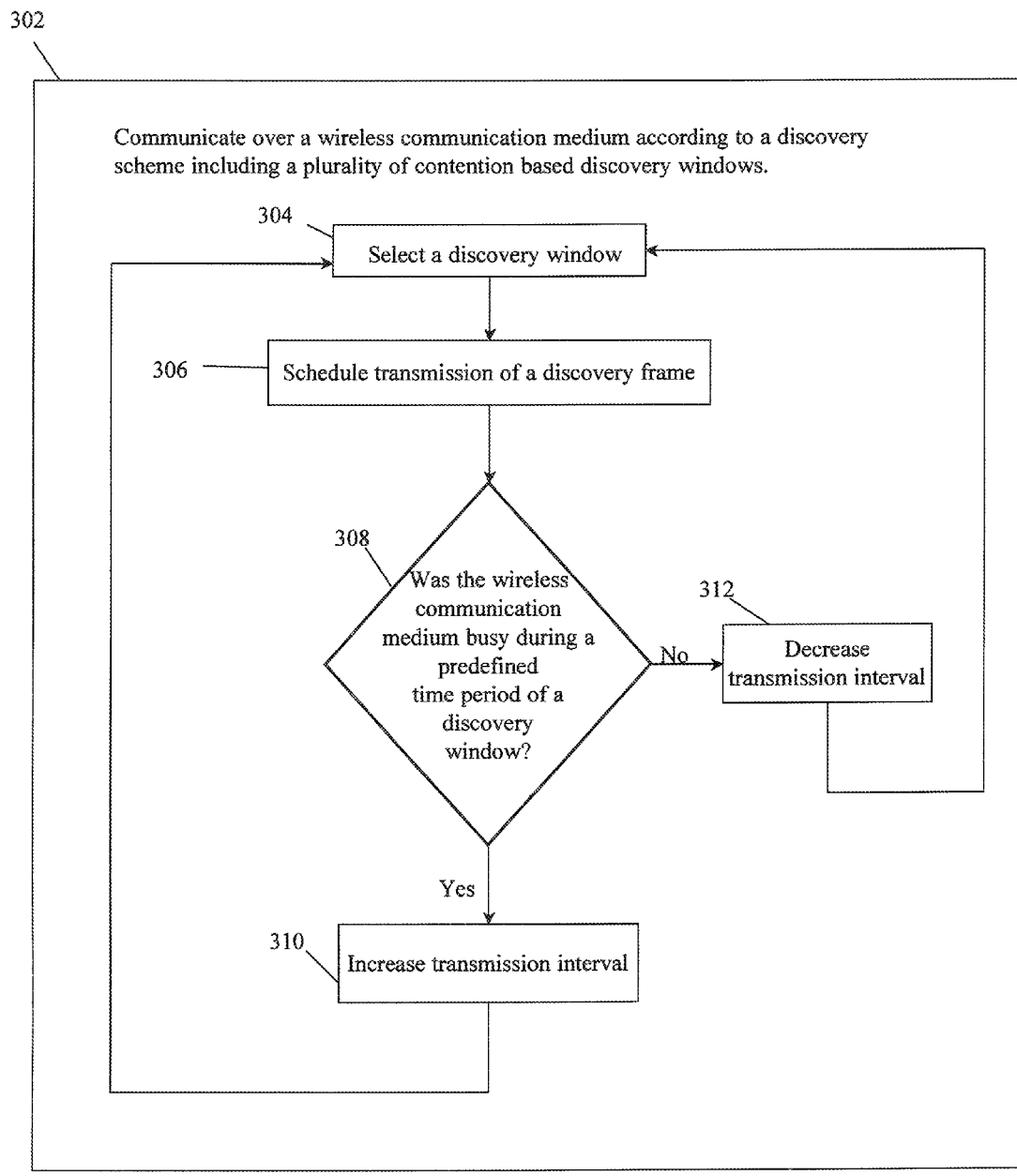
FIG. 3 is a schematic flow-chart illustration of a method of adjusting transmission intervals for discovery frames, in accordance with some demonstrative embodiments.

Reference is made to FIG. 3, which schematically illustrates a method of adjusting transmission intervals for discovery frames, in accordance with some demonstrative embodiments. For example, one or more of the operations of the method of FIG. 3 may be performed by a wireless communication system, e.g., system 100 (FIG. 1); a wireless communication device, e.g., devices 102, 104, 106 and/or 108 (FIG. 1); and/or a wireless communication unit, e.g., wireless communication units 110 and/or 120 (FIG. 1).

As indicated at block 302, the method may include communicating over a wireless communication medium according to a discovery scheme including a plurality of discovery windows. For example, wireless communication unit 110 (FIG. 1) may communicate over wireless communication medium 103 (FIG. 1) according to discovery scheme 200 (FIG. 2), e.g., as described above.

As indicated at block 304, the method may include selecting a DW according to a TI. For example, wireless communication unit 110 may select DW 210 (FIG. 2), according to TI 201 (FIG. 2), e.g., as described above.

As indicated at block 306, the method may include scheduling the transmission of the discovery frame for the selected DW. For example, wireless communication unit 110 (FIG. 1) may schedule the transmission of the discovery frame for DW 210 (FIG. 2), e.g., as described above.

As indicated at block 308, the method may include adjusting the transmission interval based on whether or not the wireless communication medium is observed to be busy during the predefined time period of the DW. For example, wireless communication unit 110 (FIG. 1) may adjust the TI based on whether or not wireless communication medium 103 (FIG. 1) is busy.

As indicated at block 310, the method may include increasing the transmission interval, e.g., if the wireless communication medium is observed to be busy during the predefined time period of the DW. For example, wireless communication medium 110 (FIG. 1) may increase the TI, e.g., according to Equation 2, 6 or 7.

As indicated at block 312, the method may include decreasing the transmission interval, e.g., if the wireless communication medium is observed not to be busy during the predefined time period of the DW. For example, wireless communication medium 110 (FIG. 1) may decrease the TI, e.g., according to Equation 3, 4 or 5.

Figure 4:
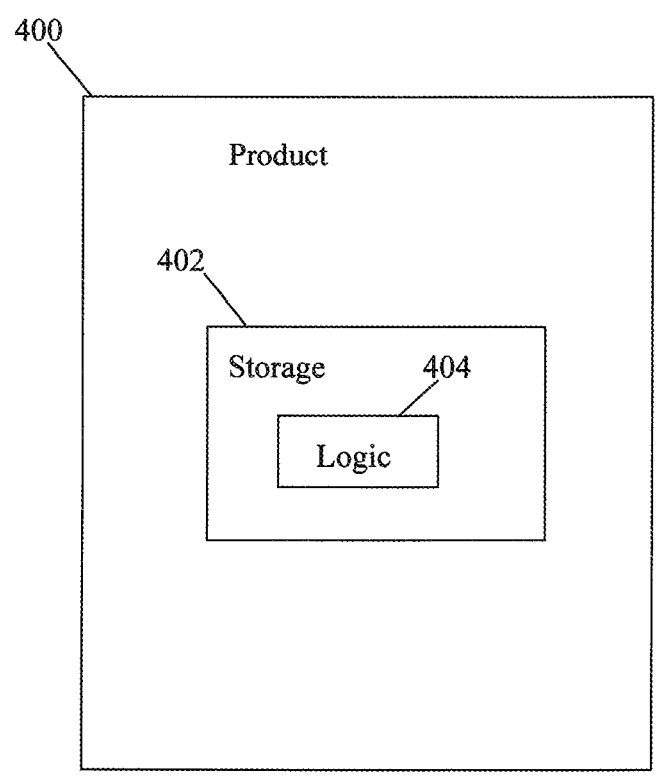
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), device 104 (FIG. 1), device 106 (FIG. 1), device 108 (FIG. 1), wireless communication unit 110 (FIG. 1), wireless communication unit 120 (FIG. 1) and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to communicate over a wireless communication medium according to a discovery scheme including a plurality of contention-based discovery windows, the wireless communication unit is to select a discovery window according to a transmission interval, to schedule transmission of a discovery frame for the discovery window, and to adjust the transmission interval based on whether or not the wireless communication medium is observed to be busy during a predefined time period of the discovery window.

Example 2 includes the subject matter of Example 1 and optionally, wherein based on the transmission interval, the wireless communication unit is to determine a number of discovery windows between successive attempts to transmit the discovery frame, and to select the discovery window according to the number of discovery windows.

Example 3 includes the subject matter of Example 2 and optionally, wherein the wireless communication unit is to select the number of discovery windows between a minimal transmission interval and the transmission interval.

Example 4 includes the subject matter of Example 3 and optionally, wherein the wireless communication unit is to select a number, denoted n, between the minimal transmission interval and the transmission interval, and to schedule transmission of the discovery frame during an n-th discovery window, wherein n=0 is a current discovery window.

Example 5 includes the subject matter of any one of Examples 1-4 and optionally, wherein the wireless communication unit is to increase the transmission interval if the medium is observed to be busy during the predefined time period.

Example 6 includes the subject matter of Example 5 and optionally, wherein the wireless communication unit is to increase the transmission interval from a first value, denoted TW, to a second value, TW+a, wherein a denotes a predefined value.

Example 7 includes the subject matter of any one of Examples 1-6 and optionally, wherein the wireless communication unit is to decrease the transmission interval if the medium is observed not to be busy during the predefined time period.

Example 8 includes the subject matter of Example 7 and optionally, wherein the wireless communication unit is to decrease the transmission interval from a first value, denoted TW, to a second value, the second value is a greatest of a minimal transmission interval, denoted TWmin, and a difference (TW-b), wherein b denotes a predefined value.

Example 9 includes the subject matter of any one of Examples 1-8 and optionally, wherein the predefined time period comprises a time period beginning at a start time of the discovery window and ending within the discovery window.

Example 10 includes the subject matter of any one of Examples 1-8 and optionally, wherein the predefined time period comprises an entirety of the discovery window.

Example 11 includes the subject matter of any one of Examples 1-10 and optionally, wherein the transmission interval comprises a Service Discovery frame transmission window (TW).

Example 12 includes the subject matter of any one of Examples 1-11 and optionally, wherein the wireless communication medium comprises a wireless communication channel over a 2.4 Gigahertz (GHz) frequency band or a 5 GHz frequency band.

Example 13 includes the subject matter of any one of Examples 1-12 and optionally, wherein the wireless communication unit is to perform the functionality of a Neighbor Awareness Networking (NAN) device to discover other NAN devices according to the discovery scheme.

Example 14 includes a system of wireless communication, the system comprising a wireless communication device including at least one antenna to communicate over a wireless communication medium; and a wireless communication unit to communicate over the wireless communication medium according to a discovery scheme including a plurality of contention-based discovery windows, the wireless communication unit is to select a discovery window within a transmission interval, to schedule transmission of a discovery frame within the discovery window, and to adjust the transmission interval based on whether or not the medium is observed to be busy during a predefined time period of the discovery window.

Example 15 includes the subject matter of Example 14 and optionally, wherein based on the transmission interval, the wireless communication unit is to determine a number of discovery windows between successive attempts to transmit the discovery frame, and to select the discovery window according to the number of discovery windows.

Example 16 includes the subject matter of Example 15 and optionally, wherein the wireless communication unit is to select the number of discovery windows between a minimal transmission interval and the transmission interval.

Example 17 includes the subject matter of Example 16 and optionally, wherein the wireless communication unit is to select a number, denoted n, between the minimal transmission interval and the transmission interval, and to schedule transmission of the discovery frame during an n-th discovery window, wherein n=0 is a current discovery window.

Example 18 includes the subject matter of any one of Examples 14-17 and optionally, wherein the wireless communication unit is to increase the transmission interval if the medium is observed to be busy during the predefined time period.

Example 19 includes the subject matter of Example 18 and optionally, wherein the wireless communication unit is to increase the transmission interval from a first value, denoted TW, to a second value, TW+a, wherein a denotes a predefined value.

Example 20 includes the subject matter of any one of Examples 14-19 and optionally, wherein the wireless communication unit is to decrease the transmission interval if the medium is observed not to be busy during the predefined time period.

Example 21 includes the subject matter of Example 20 and optionally, wherein the wireless communication unit is to decrease the transmission interval from a first value, denoted TW, to a second value, the second value is a greatest of a minimal transmission interval, denoted TWmin, and a difference (TW-b), wherein b denotes a predefined value.

Example 22 includes the subject matter of any one of Examples 14-21 and optionally, wherein the predefined time period comprises a time period beginning at a start time of the discovery window and ending within the discovery window.

Example 23 includes the subject matter of any one of Examples 14-21 and optionally, wherein the predefined time period comprises an entirety of the discovery window.

Example 24 includes the subject matter of any one of Examples 14-23 and optionally, wherein the transmission interval comprises a Service Discovery frame transmission window (TW).

Example 25 includes the subject matter of any one of Examples 14-24 and optionally, wherein the wireless communication medium comprises a wireless communication channel over a 2.4 Gigahertz (GHz) frequency band or a 5 GHz frequency band.

Example 26 includes the subject matter of any one of Examples 14-25 and optionally, wherein the wireless communication unit is to perform the functionality of a Neighbor Awareness Networking (NAN) device to discover other NAN devices according to the discovery scheme.

Example 27 includes a method of wireless communication, the method comprising selecting a discovery window from a plurality of contention-based discovery windows according to a transmission interval; scheduling for the discovery window transmission of a discovery frame over a wireless communication medium; attempting to transmit the discovery frame during the discovery window; and adjusting the transmission interval based on whether or not the wireless communication medium is observed to be busy during a predefined time period of the discovery window.

Example 28 includes the subject matter of Example 27 and optionally, comprising, based on the transmission interval, determining a number of discovery windows between successive attempts to transmit the discovery frame, and selecting the discovery window according to the number of discovery windows.

Example 29 includes the subject matter of Example 28 and optionally, comprising selecting the number of discovery windows between a minimal transmission interval and the transmission interval.

Example 30 includes the subject matter of Example 29 and optionally, comprising selecting a number, denoted n, between the minimal transmission interval and the transmission interval, and scheduling transmission of the discovery frame during an n-th discovery window, wherein n=0 is a current discovery window.

Example 31 includes the subject matter of any one of Examples 27-30 and optionally, comprising increasing the transmission interval if the medium is observed to be busy during the predefined time period.

Example 32 includes the subject matter of Example 31 and optionally, comprising increasing the transmission interval from a first value, denoted TW, to a second value, TW+a, wherein a denotes a predefined value.

Example 33 includes the subject matter of any one of Examples 27-32 and optionally, comprising decreasing the transmission interval if the medium is observed not to be busy during the predefined time period.

Example 34 includes the subject matter of Example 33 and optionally, comprising decreasing the transmission interval from a first value, denoted TW, to a second value, the second value is a greatest of a minimal transmission interval, denoted TWmin, and a difference (TW-b), wherein b denotes a predefined value.

Example 35 includes the subject matter of any one of Examples 27-34 and optionally, wherein the predefined time period comprises a time period beginning at a start time of the discovery window and ending within the discovery window.

Example 36 includes the subject matter of any one of Examples 27-34 and optionally, wherein the predefined time period comprises an entirety of the discovery window.

Example 37 includes the subject matter of any one of Examples 27-36 and optionally, wherein the transmission interval comprises a Service Discovery frame transmission window (TW).

Example 38 includes the subject matter of any one of Examples 27-37 and optionally, wherein the wireless communication medium comprises a wireless communication channel over a 2.4 Gigahertz (GHz) frequency band or a 5 GHz frequency band.

Example 39 includes the subject matter of any one of Examples 27-38 and optionally, comprising performing the functionality of a Neighbor Awareness Networking (NAN) device to discover other NAN devices according to the discovery scheme.

Example 40 includes a product including a non-transitory storage medium having stored thereon instructions that, when executed by a machine, result in selecting a discovery window from a plurality of contention-based discovery windows according to a transmission interval; scheduling for the discovery window transmission of a discovery frame over a wireless communication medium; attempting to transmit the discovery frame during the discovery window; and adjusting the transmission interval based on whether or not the wireless communication medium is observed to be busy during a predefined time period of the discovery window.

Example 41 includes the subject matter of Example 40 and optionally, wherein the instructions result in determining, based on the transmission interval, a number of discovery windows between successive attempts to transmit the discovery frame, and selecting the discovery window according to the number of discovery windows.

Example 42 includes the subject matter of Example 41 and optionally, wherein the instructions result in selecting the number of discovery windows between a minimal transmission interval and the transmission interval.

Example 43 includes the subject matter of Example 42 and optionally, wherein the instructions result in selecting a number, denoted n, between the minimal transmission interval and the transmission interval, and scheduling transmission of the discovery frame during an n-th discovery window, wherein n=0 is a current discovery window.

Example 44 includes the subject matter of any one of Examples 40-43 and optionally, wherein the instructions result in increasing the transmission interval if the medium is observed to be busy during the predefined time period.

Example 45 includes the subject matter of Example 44 and optionally, wherein the instructions result in increasing the transmission interval from a first value, denoted TW, to a second value, TW+a, wherein a denotes a predefined value.

Example 46 includes the subject matter of any one of Examples 40-45 and optionally, wherein the instructions result in decreasing the transmission interval if the medium is observed not to be busy during the predefined time period.

Example 47 includes the subject matter of Example 46 and optionally, wherein the instructions result in decreasing the transmission interval from a first value, denoted TW, to a second value, the second value is a greatest of a minimal transmission interval, denoted TWmin, and a difference (TW−b), wherein b denotes a predefined value.

Example 48 includes the subject matter of any one of Examples 40-47 and optionally, wherein the predefined time period comprises a time period beginning at a start time of the discovery window and ending within the discovery window.

Example 49 includes the subject matter of any one of Examples 40-47 and optionally, wherein the predefined time period comprises an entirety of the discovery window.

Example 50 includes the subject matter of any one of Examples 40-49 and optionally, wherein the transmission interval comprises a Service Discovery frame transmission window (TW).

Example 51 includes the subject matter of any one of Examples 40-50 and optionally, wherein the wireless communication medium comprises a wireless communication channel over a 2.4 Gigahertz (GHz) frequency band or a 5 GHz frequency band.

Example 52 includes the subject matter of any one of Examples 40-51 and optionally, wherein the instructions result in performing the functionality of a Neighbor Awareness Networking (NAN) device to discover other NAN devices according to the discovery scheme.

Example 53 includes an apparatus of wireless communication, the apparatus comprising means for selecting a discovery window from a plurality of contention-based discovery windows according to a transmission interval; means for scheduling for the discovery window transmission of a discovery frame over a wireless communication medium; means for attempting to transmit the discovery frame during the discovery window; and means for adjusting the transmission interval based on whether or not the wireless communication medium is observed to be busy during a predefined time period of the discovery window.

Example 54 includes the subject matter of Example 53 and optionally, comprising means for determining, based on the transmission interval, a number of discovery windows between successive attempts to transmit the discovery frame, and selecting the discovery window according to the number of discovery windows.

Example 55 includes the subject matter of Example 54 and optionally, comprising means for selecting the number of discovery windows between a minimal transmission interval and the transmission interval.

Example 56 includes the subject matter of Example 55 and optionally, comprising means for selecting a number, denoted n, between the minimal transmission interval and the transmission interval, and scheduling transmission of the discovery frame during an n-th discovery window, wherein n=0 is a current discovery window.

Example 57 includes the subject matter of any one of Examples 53-56 and optionally, comprising means for increasing the transmission interval if the medium is observed to be busy during the predefined time period.

Example 58 includes the subject matter of Example 57 and optionally, comprising means for increasing the transmission interval from a first value, denoted TW, to a second value, TW+a, wherein a denotes a predefined value.

Example 59 includes the subject matter of any one of Examples 53-58 and optionally, comprising means for decreasing the transmission interval if the medium is observed not to be busy during the predefined time period.

Example 60 includes the subject matter of Example 59 and optionally, comprising means for decreasing the transmission interval from a first value, denoted TW, to a second value, the second value is a greatest of a minimal transmission interval, denoted TWmin, and a difference (TW−b), wherein b denotes a predefined value.

Example 61 includes the subject matter of any one of Examples 53-60 and optionally, wherein the predefined time period comprises a time period beginning at a start time of the discovery window and ending within the discovery window.

Example 62 includes the subject matter of any one of Examples 53-60 and optionally, wherein the predefined time period comprises an entirety of the discovery window.

Example 63 includes the subject matter of any one of Examples 53-62 and optionally, wherein the transmission interval comprises a Service Discovery frame transmission window (TW).

Example 64 includes the subject matter of any one of Examples 53-63 and optionally, wherein the wireless communication medium comprises a wireless communication channel over a 2.4 Gigahertz (GHz) frequency band or a 5 GHz frequency band.

Example 65 includes the subject matter of any one of Examples 53-64 and optionally, comprising means for performing the functionality of a Neighbor Awareness Networking (NAN) device to discover other NAN devices according to the discovery scheme.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus including circuitry and logic to cause a Neighbor Awareness Networking (NAN) device to:
   select a NAN discovery window (DW) according to a transmission window (TW);
   access a channel according to a contention mechanism to transmit a NAN service discovery frame during the NAN DW; and
   set said TW based on whether or not said NAN device is able to transmit said NAN service discovery frame during a time period within said NAN DW, said time period is to begin at a start time of said NAN DW and to have a duration of three quarters a duration of said NAN DW.

2. The apparatus of claim 1 configured to cause said NAN device to decrease said TW, if said NAN device is able to transmit said NAN service discovery frame within said time period.

3. The apparatus of claim 1 to cause said NAN device to increase said TW, if the NAN device is not able to transmit said NAN service discovery frame within said time period.

4. The apparatus of claim 3 to cause said NAN device to increase said TW by two.

5. The apparatus of claim 1 to cause said NAN device to select a random number between a minimal value and the TW, and to select the NAN DW according to the random number.

6. The apparatus of claim 1 comprising a transmitter to transmit said NAN discovery frame.

7. The apparatus of claim 1 comprising one or more antennas, a memory, and a processor.

8. An apparatus including circuitry and logic to cause a Neighbor Awareness Networking (NAN) device to:
   select a NAN discovery window (DW) according to a transmission window (TW);
   access a channel according to a contention mechanism to transmit a NAN service discovery frame during the NAN DW; and
   set said TW based on whether or not said NAN device is able to transmit said NAN service discovery frame during a time period within said NAN DW, said apparatus to cause the NAN device to decrease said TW if said NAN device is able to transmit said NAN service discovery frame within said time period, said apparatus to cause the NAN device to set said TW as follows:

$$TW=\max\{TW_{min},(TW-b)\},$$

wherein $TW_{min}$ denotes a minimal value, and b denotes a predefined value.

9. The apparatus of claim 8, wherein b is one.

10. The apparatus of claim 8, wherein said time period is based on a duration of said NAN DW.

11. The apparatus of claim 8, wherein said time period is to begin at a start time of said NAN DW and to have a duration of three quarters a duration of said NAN DW.

12. A method to be performed by a Neighbor Awareness Networking (NAN) device, the method comprising:
    selecting a NAN discovery window (DW) according to a transmission window (TW);
    accessing a channel according to a contention mechanism to transmit a NAN service discovery frame during the NAN DW; and
    setting said TW based on whether or not said NAN device is able to transmit said NAN service discovery frame during a time period within said NAN DW, said time period is to begin at a start time of said NAN DW and to have a duration of three quarters a duration of said NAN DW.

13. The method of claim 12 comprising decreasing said TW, if said NAN device is able to transmit said NAN service discovery frame within said time period.

14. The method of claim 13 comprising setting said TW as follows:

$$TW=\max\{TW_{min},(TW-b)\},$$

wherein $TW_{min}$ denotes a minimal value, and b denotes a predefined value.

15. The method of claim 12 comprising increasing said TW, if the NAN device is not able to transmit said NAN service discovery frame within said time period.

16. The method of claim 12 comprising selecting a random number between a minimal value and the TW, and selecting the NAN DW according to the random number.

17. A product including one or more tangible computer-readable non-transitory storage media comprising computer-executable instructions operable to, when executed by at least one computer processor, enable the at least one computer processor to cause a Neighbor Awareness Networking (NAN) device to:
    select a NAN discovery window (DW) according to a transmission window (TW);
    access a channel according to a contention mechanism to transmit a NAN service discovery frame during the NAN DW; and
    set said TW based on whether or not said NAN device is able to transmit said NAN service discovery frame during a time period within said NAN DW, said time period is to begin at a start time of said NAN DW and to have a duration of three quarters a duration of said NAN DW.

18. The product of claim 17, wherein the instructions, when executed, cause the NAN device to decrease said TW, if said NAN device is able to transmit said NAN service discovery frame within said time period.

19. The product of claim 17, wherein the instructions, when executed, cause the NAN device to increase said TW, if the NAN device is not able to transmit said NAN service discovery frame within said time period.

20. The product of claim 19, wherein the instructions, when executed, cause the NAN device to increase said TW by two.

21. The product of claim 17, wherein the instructions, when executed, cause the NAN device to select a random number between a minimal value and the TW, and select the NAN DW according to the random number.

22. A product including one or more tangible computer-readable non-transitory storage media comprising computer-executable instructions operable to, when executed by at least one computer processor, enable the at least one computer processor to cause a Neighbor Awareness Networking (NAN) device to:
    select a NAN discovery window (DW) according to a transmission window (TW);
    access a channel according to a contention mechanism to transmit a NAN service discovery frame during the NAN DW; and set said TW based on whether or not said NAN device is able to transmit said NAN service discovery frame during a time period within said NAN DW, said instructions, when executed, to cause the NAN device to decrease said TW if said NAN device is able to transmit said NAN service discovery frame within said time period, said instructions, when executed, to cause the NAN device to set said TW as follows:

$$TW = \max\{TW_{min}, (TW-b)\},$$

wherein $TW_{min}$ denotes a minimal value, and b denotes a predefined value.

23. The product of claim 22, wherein b is one.

24. The product of claim 22, wherein said time period is based on a duration of said NAN DW.

25. The product of claim 22, wherein said time period is to begin at a start time of said NAN DW and to have a duration of three quarters a duration of said NAN DW.

* * * * *